United States Patent
Schuckers et al.

(10) Patent No.: US 9,818,020 B2
(45) Date of Patent: Nov. 14, 2017

(54) FINGERPRINT PORE ANALYSIS FOR LIVENESS DETECTION

(71) Applicant: Clarkson University, Potsdam, NY (US)

(72) Inventors: Stephanie Schuckers, Canton, NY (US); Peter Johnson, Madrid, NY (US)

(73) Assignee: Precise Biometrics AB, Lund (SE)

( * ) Notice: Subject to any disclaimer, the term of this patent is extended or adjusted under 35 U.S.C. 154(b) by 0 days.

(21) Appl. No.: 14/243,420

(22) Filed: Apr. 2, 2014

(65) Prior Publication Data

US 2014/0294262 A1  Oct. 2, 2014

Related U.S. Application Data

(60) Provisional application No. 61/807,512, filed on Apr. 2, 2013.

(51) Int. Cl.
*G06K 9/00* (2006.01)

(52) U.S. Cl.
CPC ...... *G06K 9/00114* (2013.01); *G06K 9/00073* (2013.01); *G06K 9/00107* (2013.01)

(58) Field of Classification Search
None
See application file for complete search history.

(56) References Cited

U.S. PATENT DOCUMENTS

| | | | |
|---|---|---|---|
| 7,133,541 B2 | 11/2006 | Haselsteiner et al. | |
| 8,090,163 B2 * | 1/2012 | Schuckers | G06K 9/00114 382/125 |
| 8,098,906 B2 | 1/2012 | Shuckers et al. | |
| 8,498,458 B2 | 7/2013 | Schuckers et al. | |
| 2007/0014443 A1 | 1/2007 | Russo | |
| 2007/0230754 A1 | 10/2007 | Jain et al. | |
| 2009/0310831 A1 * | 12/2009 | Zhang | G06K 9/00073 382/125 |
| 2013/0294663 A1 | 11/2013 | Schuckers et al. | |

FOREIGN PATENT DOCUMENTS

| | | | |
|---|---|---|---|
| WO | WO9906942 | 2/1999 | |
| WO | WO 9906942 A1 * | 2/1999 | G06K 9/00073 |
| WO | WO2007009016 | 1/2007 | |
| WO | WO 2007009016 A2 * | 1/2007 | G06K 9/00114 |

OTHER PUBLICATIONS

G.L. Marcialis, F. Roli, A. Tidu. "Analysis of fingerprint pores for vitality detection," 20th INternational Conference on Pattern Recognition (ICPR), pp. 1289-1292, 2010. 4 pages.*

(Continued)

*Primary Examiner* — Fred Hu
(74) *Attorney, Agent, or Firm* — Thomas Horstemeyer, LLP

(57) ABSTRACT

Various examples of systems, methods, and programs embodied in computer-readable mediums are provided for fingerprint liveness detection. Fingerprint liveness may be determined by evaluating pixels of a fingerprint image to identify pores along a ridge segment of the fingerprint image. A circular derivative operator can be used to identify the pores. Liveness of the fingerprint can be determined based upon features of the identified pores.

20 Claims, 9 Drawing Sheets

(56) References Cited

OTHER PUBLICATIONS

N. Manivanan, S. Memon, and W. Balachandran, "Automatic detection of active sweat pores of fingerprint using highpass and correlation filtering," Electronic Letters, vol. 46, No. 18, pp. 1268-1269, 2010, 2 pages.*

L. Hong, Y. Wang, and A. Jain, "Fingerprint Image Enhancement: Algorithm and Performance Evaluation," IEEE Trans. on Pattern Analysis and Machine Intelligence, vol. 20, No. 8, pp. 777-789, Aug. 1998, 30 pages.

A. Abhyankar and S. Schuckers, "Characterization, Similarity Score and Uniqueness Associated with Perspiration Pattern," Lecture Notes in Computer Science, No. 3546, pp. 301-309, 2005, 9 pages.

M. Ray, P. Meenen, and R. Adhami, "A novel approach to fingerprint pore extraction," Proceedings of the Thirty-Seventh Southeastern Symposium on System Theory SSST'05, pp. 282-286, 2005, 5 pages.

A. Abhyankar and S. Schuckers, "Towards integrating level-3 Features with perspiration pattern for robust fingerprint recognition," 17th IEEE International Conference on Image Processing (ICIP), pp. 3085-3088, 2010, 4 pages.

G. L. Marcialis, F. Roli, A. Tidu, "Analysis of fingerprint pores for vitality detection," 20th International Conference on Pattern Recognition (ICPR), pp. 1289-1292, 2010, 4 pages.

M. Espinoza and C. Champod, "Using the number of pores on fingerprint images to detect spoofing attacks," 2011 International Conference on Hand-Based Biometrics (ICHB), pp. 1-5, 2011, 5 pages.

ISR and WO for related PCT application No. PCT/US2014/032654, dated Aug. 21, 2014.

Derakhshani R et al: "Determination of vitality from a non-invasive biomedical measurement for use in fingerprint scanners", Pattern Recognition, Elsevier, GB, vol. 36, No. 2, Feb. 1, 2003 (2883-82-81), pp. 383-396, 14 pages.

Qijun Zhao et al: "Adaptive pore model for fingerprint pore extraction",19th International Conference on Pattern Recognition, 2008: ICPR 2888; Dec. 8-11 2888, Tampa, Florida, USA, IEEE, Piscataway, NJ, Dec. 8, 2008 (2888-12-88), pp. 1-4.

Bozhao Tan et al: "Liveness Detection for Fingerprint Scanners Based on the Statistics of Wavelet Signal Processing", Computer Vision and Pattern Recognition Workshop, 2006 Conference on New York, NY, Jun. 17, 2886 (2886-86-17), pp. 26-26.

* cited by examiner

FINGERPRINT PORE ANALYSIS FOR LIVENESS DETECTION

CROSS REFERENCE TO RELATED APPLICATIONS

This application claims the benefit of and priority to U.S. provisional application entitled "GENERATING TEXTURE PATTERNS" having Ser. No. 61/807,512, filed Apr. 2, 2013, which is hereby incorporated by reference in its entirely.

STATEMENT REGARDING FEDERALLY SPONSORED RESEARCH OR DEVELOPMENT

This invention was made with government support under agreement N10PC20210 awarded by the Department of Homeland Security. The Government has certain rights in the invention.

BACKGROUND

Biometric systems are emerging technologies that enable the authentication of an individual based on physiological or behavioral characteristics. Biometric techniques include recognizing faces, fingerprints, hand geometry, palms, voices, gait, irises, signature, etc. Among these biometric identifiers, fingerprint recognition is considered the most popular and efficient technique. However, a fingerprint sensor system is subject to various threats such as attacks at the sensor level, replay attacks on the data communication stream, and attacks on the database. A variety of fingerprint sensors may be spoofed through fake fingers using moldable plastic, clay, Play-Doh, wax or gelatin. From a security and accountability perspective, a biometric system should have the ability to detect when fake biometric samples are presented.

SUMMARY

Embodiments of the present disclosure methods and systems related to analysis of fingerprint liveness.

Briefly described, one embodiment, among others, comprises a method for determining fingerprint liveness. The method comprises identifying a centerline of a ridge segment in a fingerprint image; evaluating pixels about the centerline of the ridge segment in the fingerprint image to determine a local maxima; classifying the local maxima as a pore responsive to an evaluation of pixels about the local maxima; determining features of the pore based upon pixels surrounding the pore; and determining liveness of the fingerprint image based at least in part upon distributions of the determined features.

Another embodiment, among others, comprises a system. The system comprises a processor circuit having a processor and a memory and a detection system stored in the memory and executable by the processor. The detection system comprises logic that evaluates pixels about a centerline of a ridge segment in a fingerprint image to determine one or more local maxima; logic that classifies the one or more local maxima as a pore in response to an evaluation of pixels about the local maxima; logic that determines features of the pore based upon pixels surrounding the pore; and logic that determines liveness of the fingerprint image based at least in part upon distributions of the determined features.

Another embodiment, among others, comprises a non-transitory computer readable medium comprising a program. When executed by a processor system, the program evaluates pixels about a centerline of a ridge segment in a fingerprint image to determine one or more local maxima; classifies the one or more local maxima as a pore in response to an evaluation of pixels about the local maxima; determines features of the pore based upon pixels surrounding the pore; and determine liveness of the fingerprint image based at least in part upon distributions of the determined features.

In one or more embodiments of the method, system or non-transitory computer readable medium, the centerline of the ridge segment can be based upon a binary mask generated from the fingerprint image. Classification of the one or more local maxima can be based upon evaluation of pixels encircling the one or more local maxima using a circular derivative operator. The circular derivative operator can be evaluated at a predefined radius about the one or more local maxima. The one or more local maxima can be classified as a pore in response to a comparison of a predefined threshold to a result that is determined using a circular derivative operator.

Certain embodiments can include classifying pixels of the fingerprint image as ridge pixels or non-ridge pixels to generate the binary mask, thinning the binary mask to identifying the centerline of the ridge segment, and/or storing locations of the classified pores. Determining features of the pore can comprise determining a gray level mean ($m_g$), a standard deviation ($\sigma_g$), a variance ($\sigma_g^2$), or a maximum gray level difference ($D_g$) for the pore. Distributions of the determined features can comprise one or more histograms of the determined features. Determining liveness of the fingerprint image can comprise classification based upon vector representations of the distributions of the determined features.

Certain embodiments can include receiving a series of fingerprint images comprising the fingerprint image and/or determining features of the pore, where the features correspond to each of the series of fingerprint images. The liveness of the fingerprint image can be based at least in part upon the features corresponding to each of the series of fingerprint images. Certain embodiments can include identifying a centerline of a ridge segment in a fingerprint image.

Other systems, apparatus, methods, features, and advantages of the present disclosure will be or become apparent to one with skill in the art upon examination of the following drawings and detailed description. It is intended that all such additional systems, apparatus, methods, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
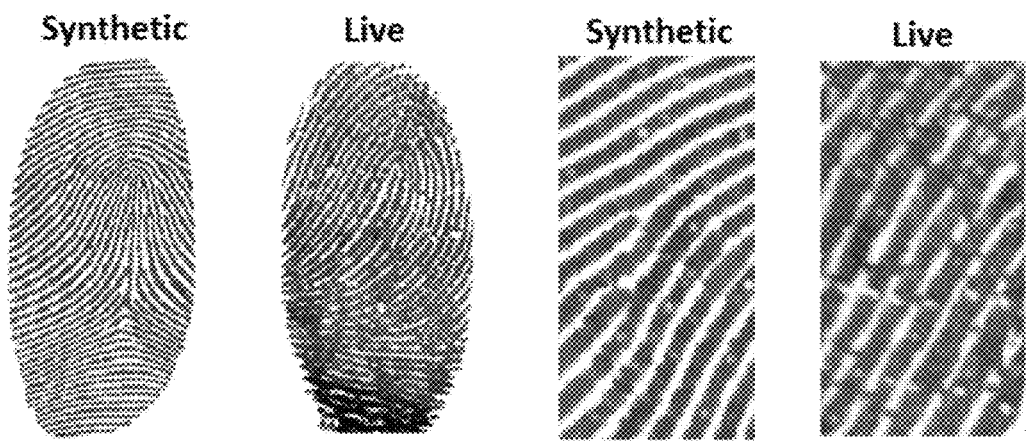
FIG. 1 includes examples of synthetic and live fingerprint images obtained using capacitive DC, optical, and/or opto-electric sensing technologies, in accordance with various embodiments of the present disclosure.

Disclosed herein are various examples related to fingerprint pore analysis for liveness detection. Reference will now be made in detail to the description of the embodiments as illustrated in the drawings, wherein like reference numbers indicate like parts throughout the several views.

Biometric systems are emerging technologies that enable the identification and verification of an individual based upon physiological or behavioral characteristics. Biometric identifiers are replacing traditional identifiers, as it is difficult to steal, replace, forget or transfer them. Fingerprint recognition systems (FRS) are among the oldest and most popular biometric authentication systems. Automatic fingerprint matching involves determining the degree of similarity between two fingerprint impressions by comparing their ridge structures and/or the spatial distributions of their minutiae points. Latent fingerprint identification relies on three levels of feature detail: (1) ridge image patterns including loops, arches and whorls; (2) ridge segment formations including ridge endings, ridge bifurcations, dots or combinations thereof; and (3) ridge path structures including ridge width, ridge shape, pores, etc. However, it may be possible to spoof different fingerprint technologies by means of relatively crude and inexpensive methods.

A fingerprint sensor system may be subject to various threats like attacks at the sensor level using artificial, or in the extreme, dismembered fingers. It may be possible to spoof a variety of fingerprint sensors with a dismembered finger or a well-duplicated synthetic finger. Spoofing is the fraudulent entry of unauthorized personnel through a fingerprint recognition system by using a faux fingerprint sample. Spoofing techniques can utilize synthetic fingers made of materials including, but not limited to, gelatin (gummy fingers), moldable plastic, clay, Play-Doh, wax, and silicon. The synthetic fingers may be developed from casts of live fingers or latent fingerprints, which were obtained using dental or other casting materials. FIG. 1 shows examples of synthetic and live fingerprint images obtained using capacitive DC, optical, and/or opto-electric sensing technologies. The synthetic fingers may be developed from features of live fingers or latent fingerprints.

Liveness detection is an anti-spoofing method that assist the fingerprint scanner in determining whether the introduced biometric is coming from a live source. Liveness detection in a fingerprint biometric system can include, but is not limited to, measuring skin resistance, temperature, pulse oximetry, and electrocardiogram (ECG). Analysis of ridge frequencies, intensity, and/or texture in fingerprint images can also be used as detection methods for liveness. In addition, pore patterns in fingerprint images can be used to detect liveness. Unlike artificial and cadaver fingers, live fingers have a distinctive pore phenomenon both statistically and dynamically.

Accurate characterization of texture patterns on the ridges can aid in the classification of fingerprints. This may be assisted by analyzing patterns in an image from a fingerprint and breaking the patterns down into features. Relevant features can be extracted from fingerprint images to create statistical distributions that may be used in the evaluation of fingerprint liveness. Features that can be considered include ridge frequency components, ridge cross-section characteristics, mean ridge intensity, pore frequency, and/or pore characteristics.

Liveness detection can comprise classification analysis based upon features of fingerprint pore variation caused by moisture variability and differences between human skin and synthetic materials such as Play-Doh, gelatin and silicone. FIG. 1 is an illustration of synthetic (e.g., Play-Doh, gelatin, or silicone) and live fingerprint images obtained using, e.g., an optical scanner. As can be observed, intensity and uniformity of the live and synthetic images vary based upon the source of the fingerprint.

A captured fingerprint image may also be affected by cleanliness of either the scanner surface (e.g., latent fingerprint impressions deposited on the surface) or the fingerprint itself. A median filter can be used to remove this kind of noise from the scanned image.

Sweat pores appear periodically along the center of ridges of the friction ridge skin on fingertips. The characterization of these sweat pores provides information that can be used for classification of the source of the fingerprint data, namely a live finger or a fake finger. Utilizing this information in a fingerprint recognition system can provide increased security of the system by guarding against a fake finger presentation attack on the system. The characteristics of sweat pores that can be used for detecting fake finger attacks are described along with methods for measuring these characteristics. For example, the activity of individual sweat pores can be used to characterize the biological process of sweat secretion of the pores.

Figure 2:
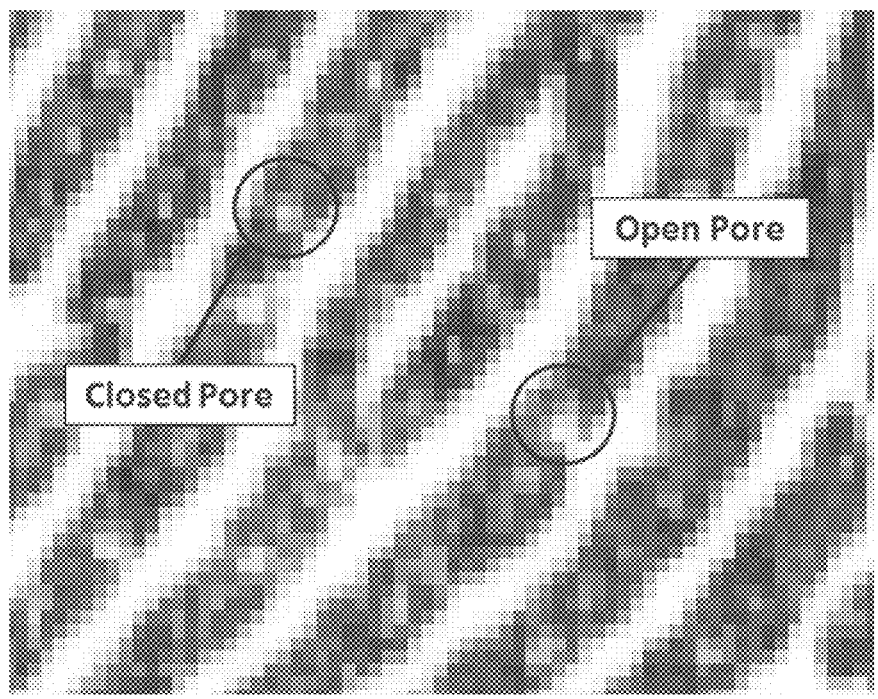
FIG. 2 is an enlarged image of a portion of a fingerprint, in accordance with various embodiments of the present disclosure.

On the surface of fingertips, aligned with the ridges of the friction ridge skin, are small openings or pores where sweat is emitted during perspiration. Pores appearing periodically on the ridge segments can be identified as small craters along the center of the ridges. A pore visible on a ridge segment can be classified as either open or closed depending on whether it is emitting sweat or not. An open pore is one that is emitting sweat and will open out into the valley on one side. A closed pore on the other hand, will appear as a closed circle in the center of the ridge. Referring to FIG. 2, shown is an image of an example of an enlarged portion of a fingerprint image. The pixel resolution of the image can be seen in the example of FIG. 2, where whiter pixels have a higher grayscale value. A pore appears as a small peak (or white pixel) along the ridges (or darker pixels) of the friction ridges skin. As illustrated in FIG. 2, open pores are partially surrounded by the darker ridge pixels, which is consistent with emitting sweat into the adjacent valley between ridges, and closed pores are encircled by the darker ridge pixels.

A number of sweat pore features can be used to characterize a fingerprint image. Sweat pore features that are useful for liveness detection include, but are not limited to, the number of pores identified in an image of a fingerprint, pore-to-pore spacing along ridge segments, identification of open and closed pores, and/or analysis of gray level distribution around pores to measure perspiration diffusion out of a pore and into the surrounding region. For example, the regular pore-to-pore spacing along the ridges of the friction ridge skin can be analyzed. As pores will often not be transferred accurately while producing a fake finger, they will likely not appear as regularly along the ridge segments of a fingerprint image captured from a fake finger as they would in a fingerprint image captured from a live finger. The frequency at which these pores appear along the ridges can be extracted by, e.g., measuring the number of pixels between each pair of pores.

In addition, the gray level distribution around individual pores can be analyzed. One attribute of a live finger, which distinguishes it from a fake (or synthetic) finger, is in the perspiration phenomenon. By analyzing the gray level distribution around individual pores, information regarding the perspiration activity of each pore can be assessed. As was discussed above, a sweat pore can be either open or closed depending on whether it is emitting perspiration or not. Given that a fake finger will not emit perspiration, identification of open pores can be used as an indication that the finger is alive. Additionally, by analyzing the gray level distribution around each pore, the diffusion of perspiration coming out of a pore into the surrounding region can be measured. This can be accomplished by taking all neighboring pixels around a pore center or by following a circular path at a defined radius around the pore center. Other defined paths around the pore center may also be used to determine the diffusion of perspiration. The pixel data along the path can be analyzed to calculate gray level mean, standard deviation, variance, and/or maximum gray level difference for the path. These measures can be used to distinguish open pores from closed pores.

Beginning with a fingerprint image, fingerprint image enhancement identifies ridges and valleys in the image, resulting in a binary image or mask. The binary ridge mask is generated by classifying pixels as one of two categories: ridge pixels or non-ridge pixels. Ridge thinning thins ridge segments of the binary mask to one pixel wide segments. The thinned ridges identify the center line of each ridge segment. The ridge segments can be thinned using morphological thinning to give a one-dimensional (1D) centerline of each ridge segment. The ridge segments can be extracted from the fingerprint image by tracking the centerline of each ridge segment. Given a thinned ridge segment, the ridge centerline can be tracked by identifying the beginning of the ridge segment and following the ridge segment to its end.

Various characteristics of the extracted ridge segments can be analyzed by taking a cross-section at each of the ridge-center pixels. Knowledge of the orientation angle at each point of the ridge can improve the accuracy of cross-sections along each ridge segment. This can be accomplished by keeping track of a defined number of preceding ridge center locations (e.g., the last ten ridge center locations) while following the ridge. By knowing the current pixel location $(x_n, y_n)$ and the location a specified number of pixels back along the ridge $(x_{n-N}, y_{n-N})$, the orientation angle $(\theta_n)$ of the cross section can be calculated using the arctangent, as given by:

$$\theta_n = \operatorname{atan}\frac{y_n - y_{n-N}}{x_n - x_{n-N}} + \frac{\pi}{2} \qquad (1)$$

A distance of N=10 pixels along the ridge was found to be most effective for calculating an accurate orientation angle given a 500 dpi resolution.

With the orientation angle $(\theta_n)$, characteristic dimensions can be determined for each of the extracted ridge segments. The cross-section of a ridge segment provides information on the slope of the ridge as it transitions from the ridge center to the valleys on either side. For example, the slope may be calculated based upon pixel grayscale variation along $\theta_n$. After calculating the slope over the cross-section for all points along the length of the ridge, the mean and standard deviation of the slope can be determined and stored as features of the ridge.

Figure 3:
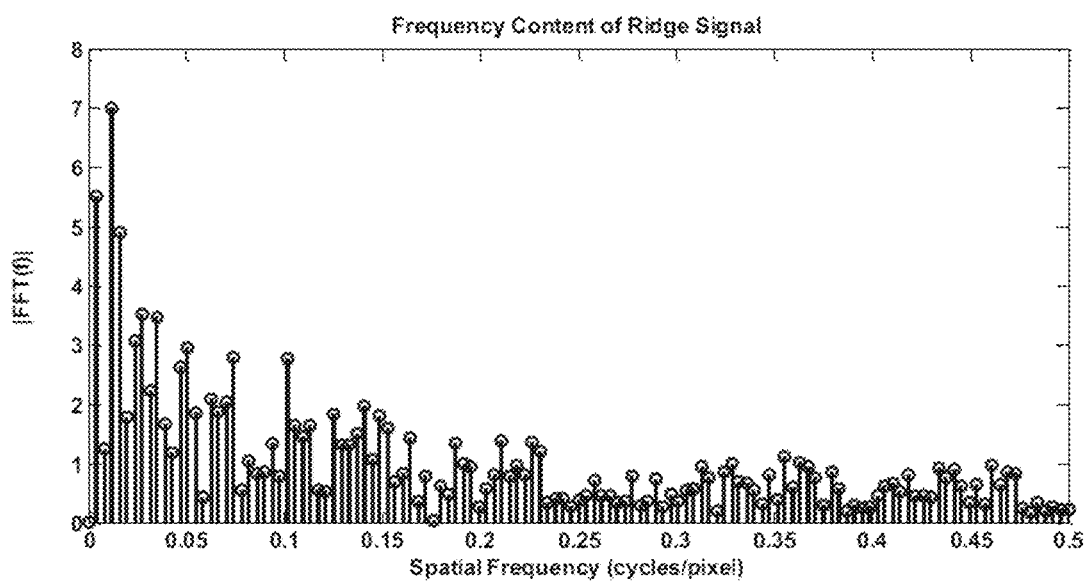
FIG. 3 is a plot of an example of frequency content of a fingerprint ridge signal extracted from a fingerprint image, in accordance with various embodiments of the present disclosure.

Frequency composition along the length of the ridge can also be evaluated. Frequency analysis of the ridge signal can be used to identify low frequency components along with noise. By identifying the low frequency components, a noiseless signal approximating the ridge can be generated and subtracted from the original ridge information to give an estimate of the noise in the signal. FIG. 3 shows an example of the frequency content of a ridge signal. The Fast Fourier Transform (FFT) components are based upon the grayscale values of the pixels along the centerline of the ridge segment. In FIG. 3, a high amount of spectral energy is observed in a few low frequency components. An approximate reconstruction of the ridge signal can be based upon a defined number of the low frequency components.

Figure 4:
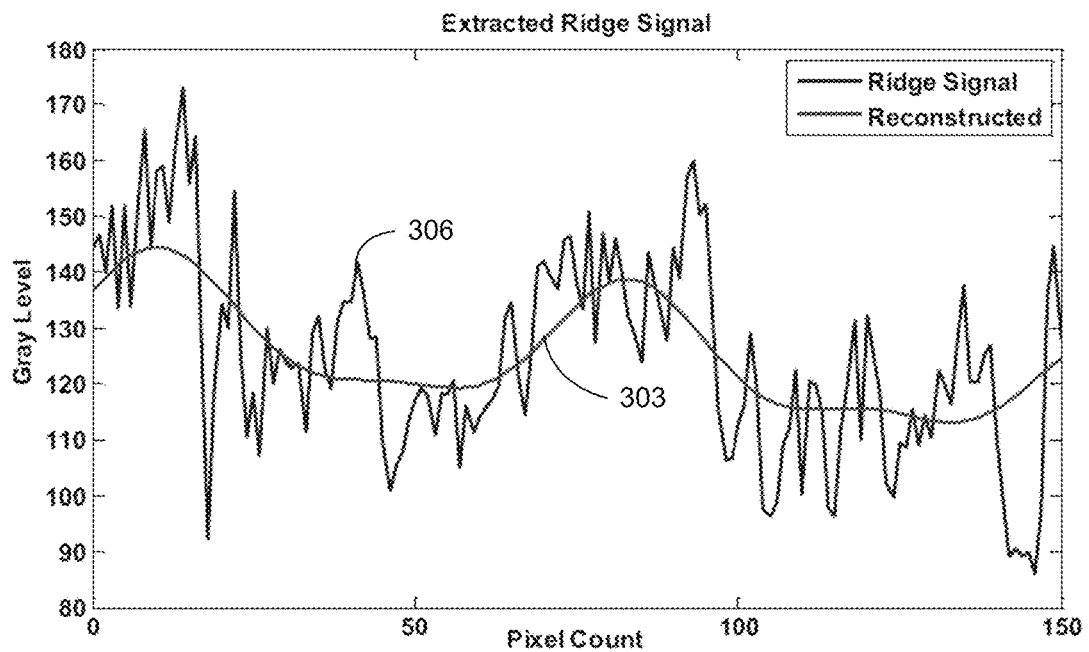
FIG. 4 is a plot comparing the extracted ridge signal to a reconstructed ridge signal based upon selected frequency content of FIG. 3, in accordance with various embodiments of the present disclosure.

Referring to FIG. 4, the four highest components of FIG. 3 (with the largest amplitudes) and the mean value (DC component) of the ridge signal were used to represent the reconstructed ridge signal (curve 303), which is shown with the analyzed ridge signal (curve 306). Another feature of interest is the average intensity of the ridge segment. These three features (slopes of the ridge, reconstructed ridge signal, and average intensity), along with the mean and standard deviation of the derivatives of the cross-sections, can be used to modeled from ridges of the fingerprint image. For an image of a live fingerprint, the features may be used to generate ridge segments that can be superimposed onto a binary ridge map of a synthetic fingerprint image.

Other features that can be used to characterize texture patterns of the ridge segments of a fingerprint image are shown below in TABLE 1. In some implementations, one or more of these features can be extracted from the fingerprint image.

TABLE 1

| Feature Name | Feature Description |
| --- | --- |
| $\mu_{dx}$ | Cross-section derivative mean |
| $\sigma_{dx}$ | Cross-section derivative standard deviation |
| $\mu_R$ | Average ridge intensity |
| $f_{1\ldots N}$ | N Ridge frequency components |
| $\mu_n$ | Noise mean |
| $\sigma_n$ | Noise standard deviation |
| $\mu_{P_{freq}}$ | Pore frequency mean |
| $\sigma_{P_{freq}}$ | Pore frequency standard deviation |
| $\mu_{P_{Intensity}}$ | Pore intensity mean |
| $\sigma_{P_{Intensity}}$ | Pore intensity standard deviation |

Figure 5:
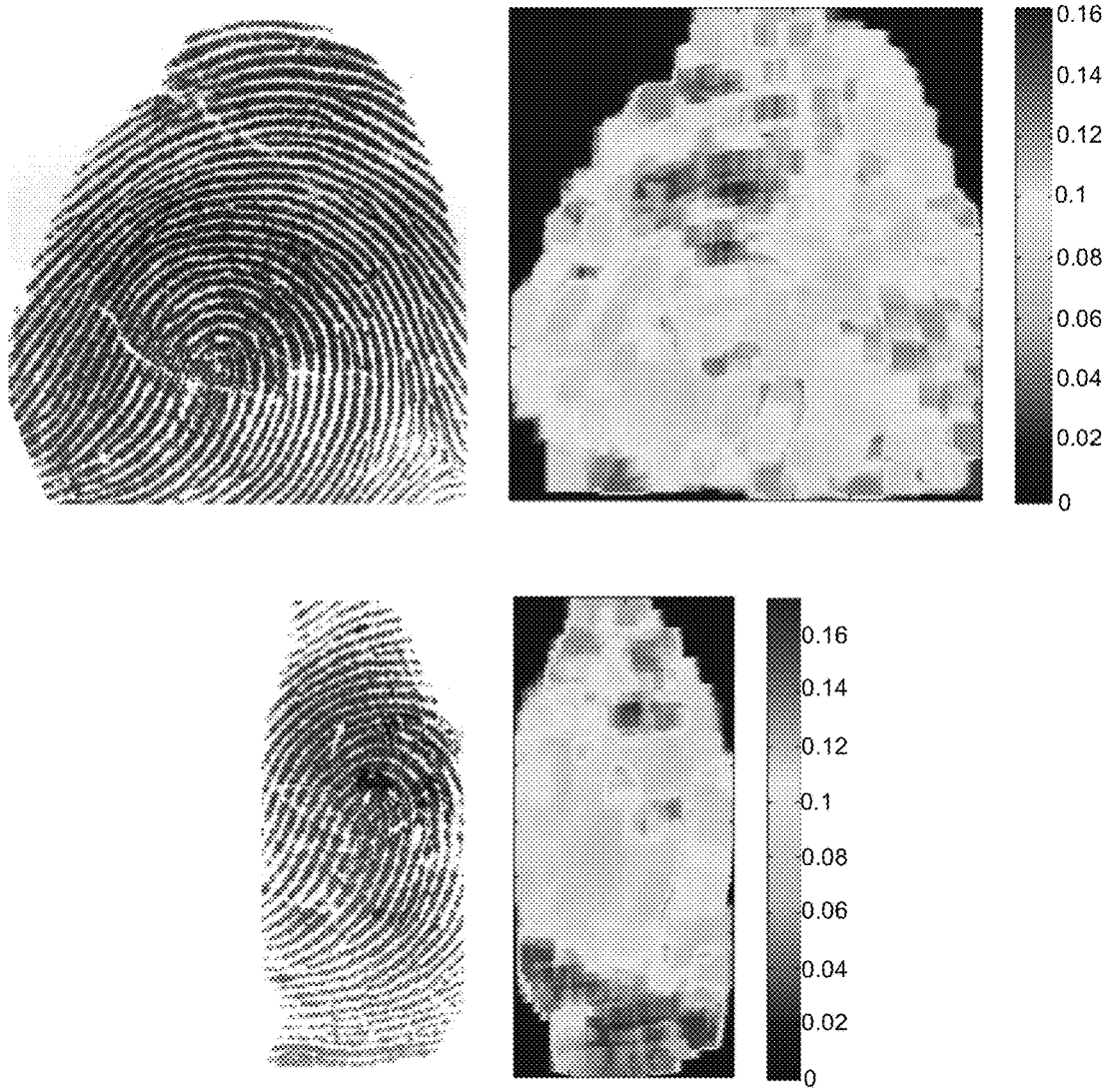
FIG. 5 includes examples of fingerprint images and corresponding density maps, in accordance with various embodiments of the present disclosure.

The orientation angles along the ridge segments also provide two additional features of the fingerprint image: a density map and an orientation map of the image. The density map can be formed by measuring the distance between the current ridge segment and the two adjacent ridge segments at the specified orientation angle ($\theta_n$). By doing this operation along each ridge segment, a density map for the fingerprint image can be constructed. Smoothing may improve accuracy of the density map. In the same way, an orientation map for the image can be determined. FIG. 5 shows examples of fingerprint images and their corresponding density maps.

During tracking of the ridge centerlines, sweat pores along the ridge can be identified. For each ridge center pixel, all the pixels falling within a defined radius (d) of that pixel are searched as possible pore center canadates. A pore appears as a small peak in the ridge. For example, in the example of FIG. 2, whiter pixels have higher grayscale values which can be used to identify local maxima on the ridges. Pore centers are identified by searching the ridge segments for local maxima in the gray level. Comparison with various predefined threshold criteria can be used in the identification process. This allows pores to be detected in a variety of image resolutions, not just 1000 pixels per inch (ppi) or greater, as is typically needed. During the search, all pixels not identified as ridge pixels in the binary ridge mask can be discarded.

The search to identify pores on the ridge can use a circular derivative operator to identify local maxima about pixels of the ridge segment. Appropriate thresholds may be set as decision criteria and used to identify the pores. Given a fingerprint image I(x, y) with pixels locations identified by (x, y), and converting to polar coordinates to give I(r cos($\theta$), r sin($\theta$)), the circular derivative operator with decision criteria at each pixel location (x, y) within the boundaries of the ridge can be defined as:

$$\sum_{\theta=0}^{2\pi} -\frac{d}{dr} I(x + r\cos(\theta), y + r\sin(\theta)) > \text{threshold} \quad (2)$$

In EQN. (2), the maximum value of the radius r can be defined based upon the resolution (e.g., ppi) of the fingerprint image. The threshold can be set to a constant value for all images or may be precomputed for each image based on the statistics of the gray level distribution of that fingerprint image.

Once a pore is identified, the statistics of the gray level (or scale) values in a circular path of radius d around the pore, such as gray level mean ($m_g$), standard deviation ($\sigma_g$), variance ($\sigma_g^2$), and/or maximum gray level difference ($D_g^2$) are analyzed. The corresponding calculations are shown in EQNS. (3)-(6):

$$m_g(x, y) = \frac{1}{2\pi} \sum_{\theta=0}^{2\pi} I(x + d\cos(\theta), y + d\sin(\theta)) \quad (3)$$

$$\sigma_g(x, y) = \sqrt{\frac{1}{2\pi} \sum_{\theta=0}^{2\pi} (I(x + d\cos(\theta), y + d\sin(\theta)) - m_g(x, y))^2} \quad (4)$$

$$\sigma_g^2(x, y) = \frac{1}{2\pi} \sum_{\theta=0}^{2\pi} (I(x + d\cos(\theta), y + d\sin(\theta)) - m_g(x, y))^2 \quad (5)$$

$$D_g(x, y) = \max_\theta (I(x + d\cos(\theta), y + d\sin(\theta))) - \min_\theta (I(x + d\cos(\theta), y + d\sin(\theta))) \quad (6)$$

The location of the pore center is then mapped to the nearest ridge center pixel and the distance from the previous mapped pore center is determined, giving the pore-to-pore spacing along ridge segments. Other identified features or characteristics of the pores can include pore frequency, pore size, and/or pore intensity.

The above described characteristics can be extracted from a fingerprint image and formed into distributions, which can be analyzed and used for distinguishing between live and fake fingers. The analysis of these distributions can take the form of histogram analysis, along with calculation of a number of first order statistics including, but not limited to mean, standard deviation, median, and variance. For an 8-bit grayscale image, there are 256 different possible intensities (i.e., 0-255, where 0 is black and 255 is white). Other grayscales (e.g., 16- or 32-bit) or color scales may be utilized. Thus, the associated histogram will graphically display the distribution of pixels among those grayscale values.

After features (or characteristics) relating to the sweat pores have been extracted as discussed above, the fingerprint image can be classified into one of two classes: live or fake. The features can be represented as vectors, being clustered in a high dimensional space, where a decision boundary is defined between the clusters of each class. Classification techniques for defining this decision boundary include, but are not limited to, multi-layer perceptron (MLP), support vector machine (SVM), decision trees, and other types of classifiers. The classifier can output a score within some defined range, which indicates the likelihood that the fingerprint image belongs in either of the classes. Based on the score, the fingerprint image can be classified as live or fake. The classification can be in response to a comparison with a specified classification threshold.

Neural networks are pattern classification methods for non-linear problems. Multilayer perceptrons (MLPs) are feed forward neural networks trained with the standard back-propagation algorithm. Supervised networks are trained to transform data into a desired response. The multilayer perceptron is capable of learning a rich variety of nonlinear decision surfaces. In one embodiment, a two-layer feed-forward network can be created where the inputs are the extracted statistical features of the pores. The first hidden layer can use three tansig neurons and the second layer can use one purelin neuron. The "trainlm" network training function may be used. For convenience of training, bipolar targets (+1 and −1) are chosen to denote "live" and "not live" categories, respectively. One skilled in the art would understand that other types of neural networks could be utilized.

Nearest Neighbor classifier is another supervised statistical pattern recognition method which can be used. Nearest Neighbor classifiers are described in "Instance-based learning algorithms," D. Aha and D. Kibler, *Machine Learning*, vol. 6, pp. 37-66, 1991, which is hereby incorporated by reference in its entirety. This classifier achieves consistently high performance without a priori assumptions about the distributions from which the training examples are drawn. It utilizes a training set of both positive and negative cases. A new sample is classified by calculating the normalized Euclidean distance to the nearest training case.

Classification trees may also be utilized to classify the image. Classification trees derive a sequence of if-then-else rules using a training data set in order to assign a class label to the input data. The user can view the decision rules to verify that the rules match their understanding of the classification. Several learning and searching strategies are utilized to train the models including, but not limited to, ADTree, J48, Random Forest, and Bagging Tree. ADTree classification is described in "The alternating decision tree learning algorithm," Y. Freund and L. Mason, *Proceeding of the Sixteenth International Conference on Machine Learning*, Bled, Slovenia, pp. 124-133, 1999, which is hereby incorporated by reference in its entirety. J48 classification is described in *C4.5: Programs for Machine Learning*, R. Quinlan, 1993, which is hereby incorporated by reference in its entirety. Random Forest classification is described in "Random Forests," L. Breiman, *Machine Learning*, 45(1): 5-32, 2001, which is hereby incorporated by reference in its entirety. Bagging Tree classification is described in "Bagging Predictors," L. Breiman, *Machine Learning*, 24(2):123-140, 1996, which is hereby incorporated by reference in its entirety.

A support vector machine (SVM) may also be used to make the classification. Support vector machines are described in *Fast Training of Support Vector Machines using Sequential Minimal Optimization*, J. Platt, Chap. 12: Advances in Kernel Methods—Support Vector Learning, pp. 185-208, 1999, which is hereby incorporated by reference in its entirety. Support vector machines are a set of related supervised learning methods used for classification. SVMs simultaneously minimize the empirical classification error and maximize the geometric margin; hence they are also known as maximum margin classifiers. SVMs map input vectors to a higher dimensional space where a maximal separating hyperplane is constructed. Two parallel hyperplanes are constructed on each side of the hyperplane that separates the data. The separating hyperplane is the hyperplane that maximizes the distance between the two parallel hyperplanes. The larger the margin or distance between these parallel hyperplanes, the better the generalization error of the classifier will be. Classification of new input data is based upon which plane it is mapped to.

An extension of the above mentioned features is to acquire a plurality of fingerprint images as a time-series and observe the change in each mentioned characteristic of the identified pores over time. This would allow the finger to perspire while on the sensor surface, which can enhance the pore identification and feature extraction. Variation between the classifier scores associated with the images of the time-series can be used to indicate reliability of the classification of the fingerprint images.

Performance evaluation can be conducted by varying the classification threshold over the range of scores and counting the misclassifications at each threshold level. The results are presented by plotting the false accept rate (FAR) against the false reject rate (FRR) as a receiver operating characteristic (ROC) or detection error tradeoff (DET) curve. The point at which the FAR equals the FRR can be defined as the equal error rate (EER) and may be used to quantify performance.

Figure 6A:
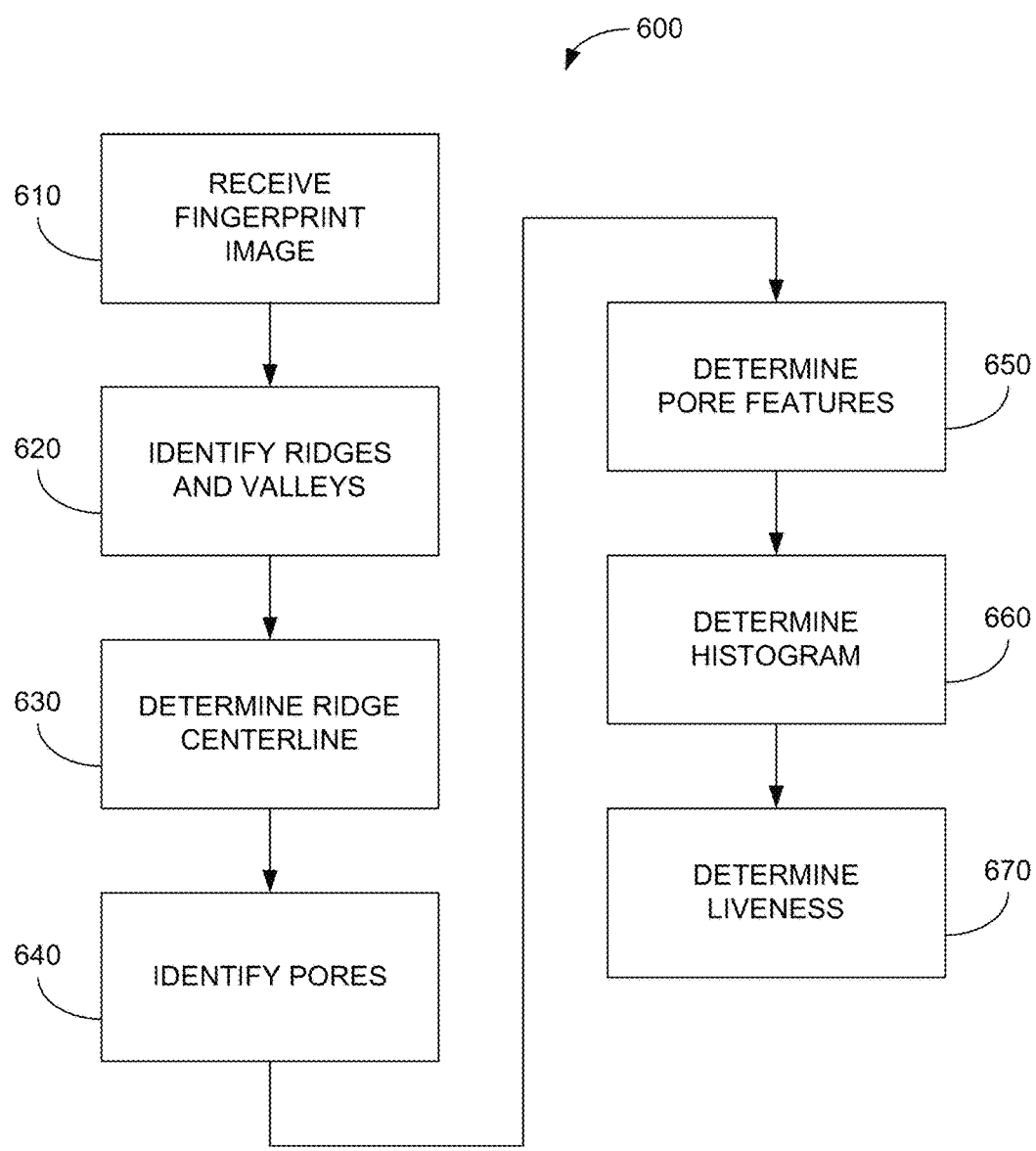
FIGS. 6A and 6B are flow charts that provide examples of the operation of a system to determine liveness of fingerprint images, such as those illustrated in FIG. 1, in accordance with various embodiments of the present disclosure.

Referring next to FIG. 6A, shown is a flow chart 600 that provides one example of the operation of a system to determine liveness of fingerprint images, such as those illustrated in FIG. 1, utilizing fingerprint pore analysis according to various embodiments of the present disclosure. Alternatively, the flow chart of FIG. 6A may be viewed as depicting steps of an example of a method implemented in a processor system 700 (FIG. 7) to determine liveness of fingerprint images as set forth above. The functionality of the fingerprint liveness detection as depicted by the example flow chart of FIG. 6A may be implemented, for example, in an object oriented design or in some other programming architecture. Assuming the functionality is implemented in an object oriented design, then each block represents functionality that may be implemented in one or more methods that are encapsulated in one or more objects. The fingerprint liveness detection may be implemented using any one of a number of programming languages such as, for example, C, C++, or other programming languages.

Beginning with 610, a fingerprint image is received. In 620, the image is initially processed to identify ridges and valleys in the image. Each of the pixels can be classified as one of two categories: ridge pixels or non-ridge pixels. For example, pixel gray scale values can be compared to a defined threshold to determine the pixel classification. The classification of adjacent pixels can also be considered during the process to reduce errors in classifications. A binary mask can be generated to indicate the classifications of the image pixels. The ridge centerlines can be determined in 630 using the binary mask. The ridge segments of the binary mask can be thinned to one pixel wide segments using, e.g., morphological thinning. The ridge centerline can be tracked by identifying the beginning of the ridge segment and following the ridge segment to its end. The ridge segments can thus be extracted from the fingerprint image by tracking their centerlines.

Figure 6B:
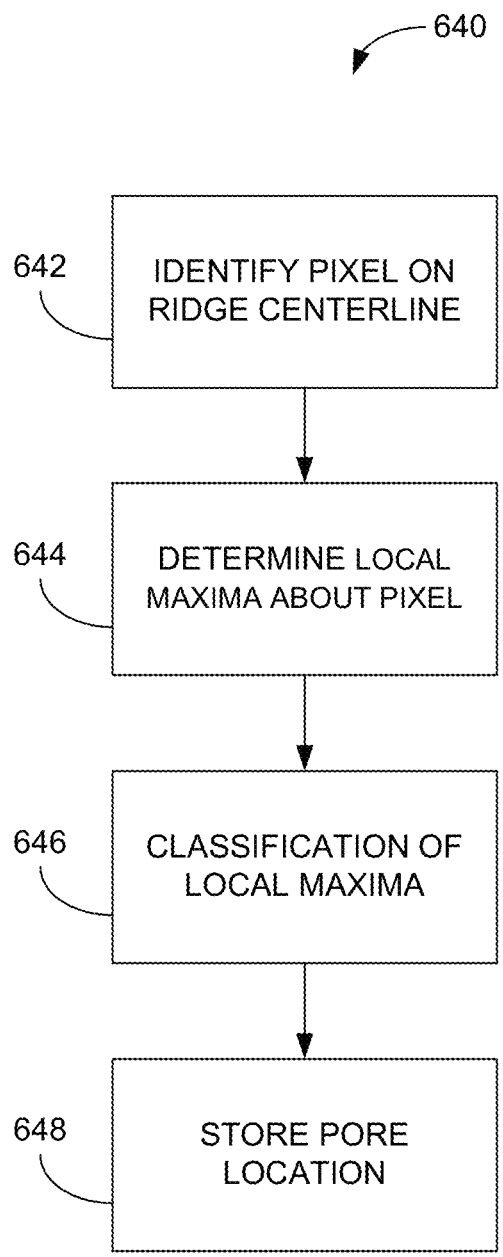

In 640, sweat pores along ridge segments can be identified. Referring to FIG. 6B, shown is a flow chart that provides one example of pore identification in 640. The identification may be carried out during tracking of the ridge centerlines. Once a pixel on the ridge centerline has been identified in 642, pixels within a defined radius (d) of that pixel are evaluated to determine local maxima in 644. Gray scale values of the pixels within radius d can be used to identify local maxima on the ridge section by, e.g., comparison to a predefined threshold. Pixels not identified as ridge pixels in the binary ridge mask may be ignored. In 646, local maxima that have been identified may be classified using, e.g., the circular derivative operator of EQN. (2). The value of the radius r can be defined based upon the resolution of the fingerprint image and the threshold can be a constant value or precomputed for the image based upon statistics of the gray level distribution. Identified pore locations can then be stored in 648.

Referring back to FIG. 6A, features of the pores are determined in 650. Once a pore is identified, the statistics of the gray scale values in a circular path of radius d around the pore are determined. For example, gray level mean ($m_g$), standard deviation ($\sigma_g$), variance ($\sigma_g^2$), and/or maximum gray level difference ($D_g$) can be determined using EQNS. (3)-(6). Pore frequency can also be determined by mapping the pore center to the nearest ridge center pixel and using the distance from the previous mapped pore center to give the pore-to-pore spacing along the ridge segment. The characteristics extracted from the fingerprint image can be formed into distributions in 660 and used for distinguishing between live and fake fingers. The distributions can take the form of histograms of, e.g., mean, standard deviation, median, and variance. The fingerprint image can then be classified as live or fake in 670 using classification techniques such as multilayer perceptron (MLP), support vector machine (SVM), decision trees, and other types of classifiers as previously described. The features can be represented as vectors, being clustered in a high dimensional space, where a decision boundary is defined between the clusters of each class.

Figure 7:
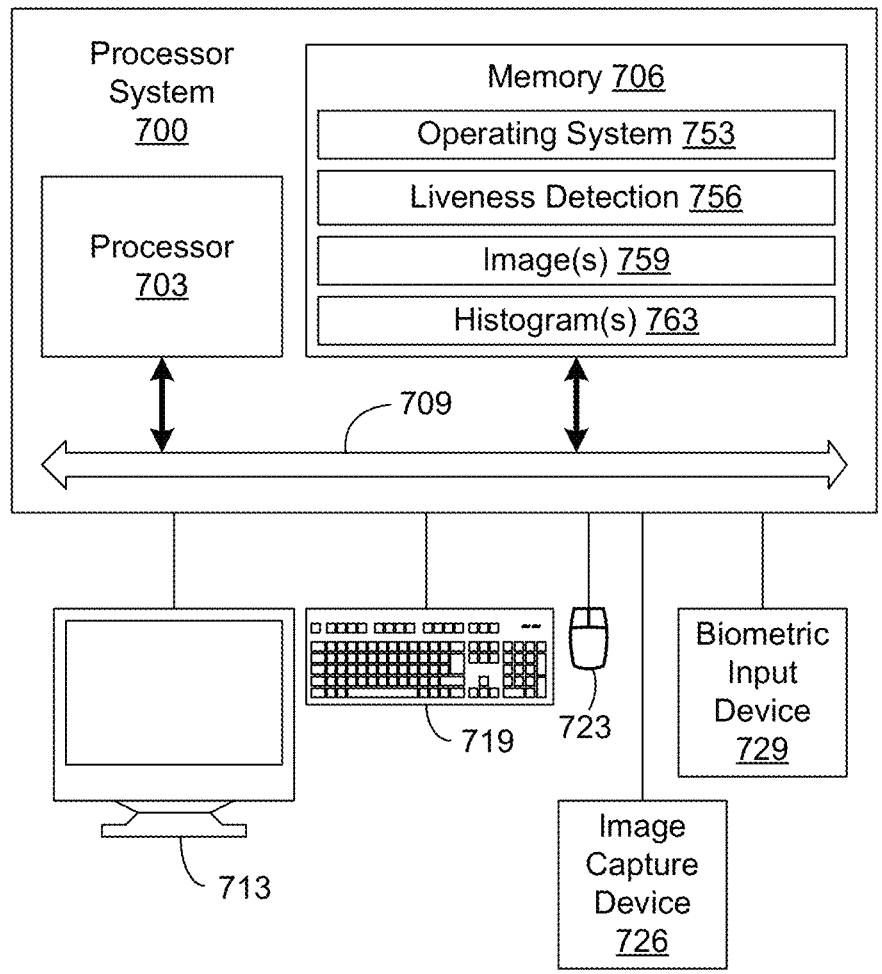
FIG. 7 is a schematic block diagram of one example of a system employed to detect fingerprint liveness and to perform various analysis with respect to the fingerprint liveness detection, in accordance with various embodiments of the present disclosure.

Referring next to FIG. 7, shown is one example of a system that performs various functions using fingerprint liveness detection according to the various embodiments as set forth above. As shown, a processor system 700 is provided that includes a processor 703 and a memory 706, both of which are coupled to a local interface 709. The local interface 709 may be, for example, a data bus with an accompanying control/address bus as can be appreciated by those with ordinary skill in the art. The processor system 700 may comprise, for example, a computer system such as a server, desktop computer, laptop, personal digital assistant, or other system with like capability.

Coupled to the processor system 700 are various peripheral devices such as, for example, a display device 713, a keyboard 719, and a mouse 723. In addition, other peripheral devices that allow for the capture of various patterns may be coupled to the processor system 700 such as, for example, an image capture device 726 or a biometric input device 729. The image capture device 726 may comprise, for example, a digital camera or other such device that generates images that comprise patterns to be analyzed as described above. Also, the biometric input device 729 may comprise, for example, a fingerprint input device, optical scanner, or other biometric device 729 as can be appreciated.

Stored in the memory 706 and executed by the processor 703 are various components that provide various functionality according to the various embodiments of the present invention. In the example embodiment shown, stored in the memory 706 is an operating system 753 and a fingerprint liveness detection application 756. In addition, stored in the memory 706 are various images 759, various histograms 763, and potentially other information associated with the fingerprint images. The histograms 763 may be associated with corresponding ones of the various images 759. The images 759 and the histograms 763 may be stored in a database to be accessed by the other systems as needed. The images 759 may comprise fingerprints such as the images in FIG. 1 or other patterns as can be appreciated. The images 759 comprise, for example, a digital representation of physical patterns or digital information such as data, etc.

The fingerprint liveness detection application 756 is executed by the processor 703 in order to classify whether a fingerprint image is "live" or "not live" as described above. A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, or source code that may be expressed in proper format such as object code that is capable of being loaded into a of random access portion of the memory 706 and executed by the processor 703, etc. An executable program may be stored in any portion or component of the memory 506 including, for example, random access memory, read-only memory, a hard drive, compact disk (CD), floppy disk, or other memory components.

The memory 706 is defined herein as both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 703 may represent multiple processors and the memory 706 may represent multiple memories that operate in parallel. In such a case, the local interface 709 may be an appropriate network that facilitates communication between any two of the multiple processors, between any processor and any one of the memories, or between any two of the memories etc. The processor 703 may be of electrical, optical, or molecular construction, or of some other construction as can be appreciated by those with ordinary skill in the art.

The operating system 753 is executed to control the allocation and usage of hardware resources such as the memory, processing time and peripheral devices in the processor system 700. In this manner, the operating system 753 serves as the foundation on which applications depend as is generally known by those with ordinary skill in the art.

Although the fingerprint liveness detection application 756 is described as being embodied in software or code executed by general purpose hardware as discussed above, as an alternative the same may also be embodied in dedicated hardware or a combination of software/general purpose hardware and dedicated hardware. If embodied in dedicated hardware, each of the fingerprint liveness detection application 756 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 6A and 6B show the architecture, functionality, and operation of an implementation of the fingerprint liveness detection application 756. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 6A and 6B show a specific order of execution, it is understood that the order of execution may differ from that which is depicted. For example, the order of execution of two or more blocks may be scrambled relative to the order shown. Also, two or more blocks shown in succession in FIGS. 6A and 6B may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the fingerprint liveness detection application 756 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the fingerprint liveness detection application 756 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Performance Analysis

For the performance assessment of the liveness detection application 756, three datasets were chosen for testing. The first dataset was collected on a Cross Match Guardian fingerprint sensor and consisted of 5000 live fingerprint images and 5000 fake fingerprint images. Each set of 5000 images was split into 3336 images for training and 1664 images for testing. The second dataset was the part of the LivDet 2013 dataset ("LivDet 2013 fingerprint liveness detection competition 2013" by Ghiani et al., 2013 *International Conference on Biometrics (ICB)*, pp. 1-6, June 2013) that was collected on a Biometrika fingerprint sensor. This dataset consisted of 2000 live fingerprint images and 2000 fake fingerprint images, with each set of 2000 images split into 1000 images for training and 1000 images for testing. The third dataset is the part of the LivDet 2013 dataset collected on the Italdata fingerprint sensor. This dataset also consisted of 2000 live fingerprint images and 2000 fake fingerprint images, with each set of 2000 images split into 1000 images for training and 1000 images for testing.

The performance analysis is presented in the form of detection error tradeoff (DET) curves, where false accept rate (FAR) is plotted against false reject rate (FRR). False accept rate is the percentage of fake fingers that are accepted by the algorithm and false reject rate is the percentage of live fingers that are rejected by the system. The FAR and FRR change in the form of a tradeoff as a decision threshold in the algorithm is varied. The point at which the curves intersect is known as the equal error rate (EER) and is used here to give a metric for the performance on each fingerprint dataset. A lower EER indicates a better performing algorithm.

Three different implementations of liveness determinations were compared. The first was the above described fingerprint liveness detection application for analysis of fingerprint pores. The second implementation acted as a baseline application and was the liveness detection system to which the above described liveness application can be added. The third implementation is the combination of the baseline application and the fingerprint liveness detection application. This illustrates the benefit of adding the above described fingerprint liveness detection application to an existing liveness detection system to improve performance. A support vector machine (SVM) was used for classification of the extracted features. The LIBSVM library ("LIBSVM: a library for support vector machines" by Chang et al., *ACM Transactions on Intelligent Systems and Technology (TIST)*, Vol. 2, No. 3, pp. 27, April 2011) was utilized for this task.

Figure 8:
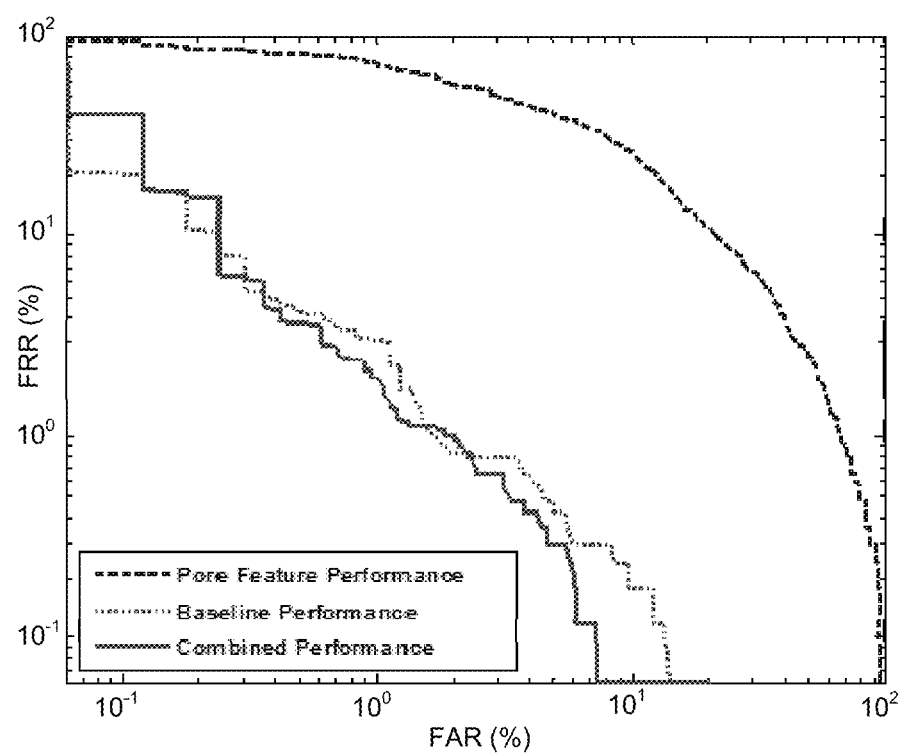
FIGS. 8-10 are plots illustrating liveness detection performance evaluations, in accordance with various embodiments of the present disclosure.

FIG. 8 shows an example of the performance using the Cross Match dataset. The EERs are presented in TABLE 2 below. From these results, it is evident that the fingerprint pore liveness detection application on its own does not provide good liveness detection performance. However, when combined with the baseline algorithm, an EER is obtained lower than that of the baseline performance. This shows that incorporating the pore liveness detection into the baseline algorithm improves performance, reducing the ERR from 1.44% to 1.23%.

TABLE 2

|  | Cross Match Dataset | Biometrika Dataset | Italdata Dataset |
| --- | --- | --- | --- |
| Pore Feature Performance | 15.47% | 1.8% | 1.2% |
| Baseline Performance | 1.44% | 2.75% | 1.5% |
| Combined Performance | 1.23% | 2.2% | 1.3% |

Figure 9:
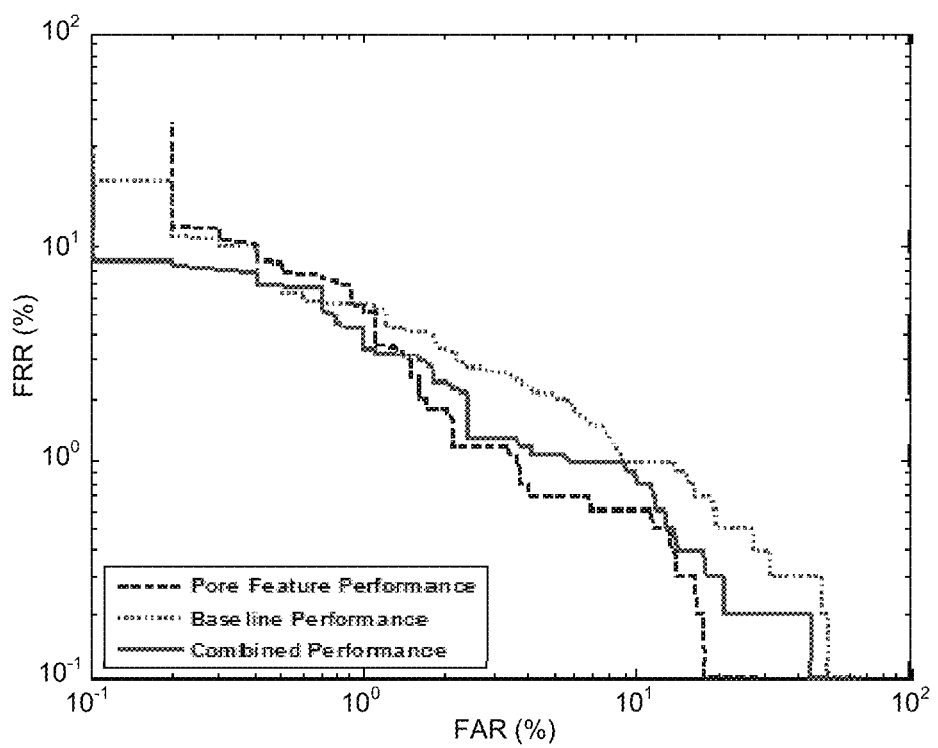
Figure 10:
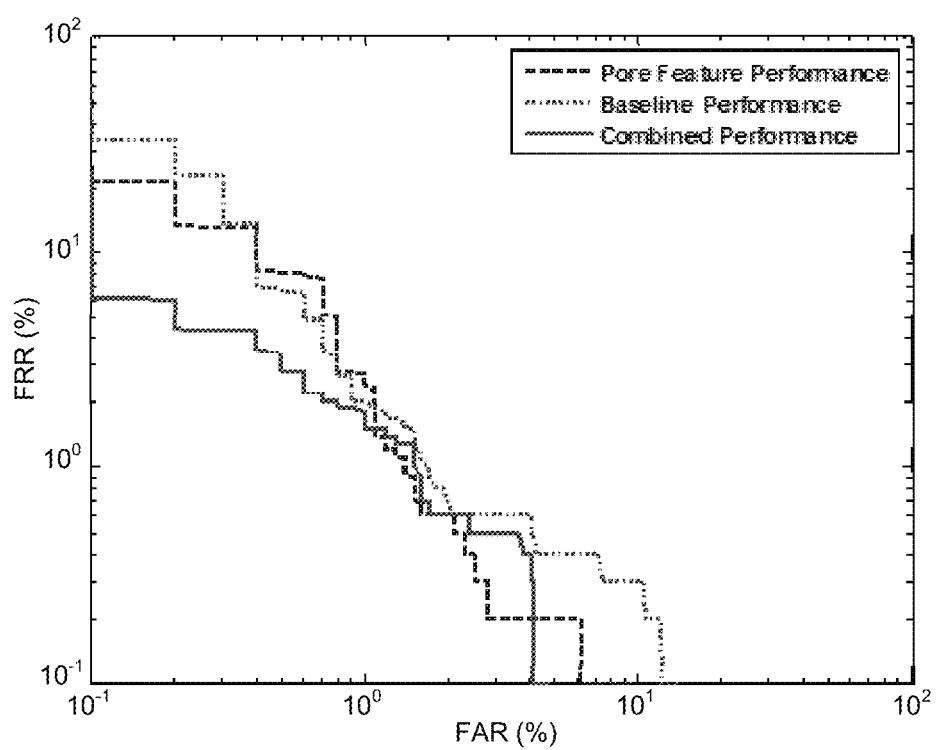

FIG. 9 shows the performance using the Biometrika dataset. For this fingerprint dataset, the pore liveness detection application provided better performance on its own than the baseline algorithm, with 1.8% EER compared to 2.75% EER respectively. This phenomenon is also seen in the analysis of the Italdata dataset in FIG. 10. Again, the performance analysis using each of the LivDet 2013 datasets shows that incorporating the fingerprint pore liveness detection into the baseline algorithm improves performance over the baseline algorithm alone.

The analysis of fingerprint pores as conducted by the fingerprint liveness detection application described above has been shown to be a robust approach for distinguishing between live and fake fingerprints. The application is computationally simple and efficient, capable of being implemented on a wide range of computing platforms. On certain fingerprint datasets, the fingerprint liveness detection application is useful on its own, however, combining with complimentary liveness detection applications can provide the overall best performance for detecting fake finger presentations to fingerprint recognition systems. With the use of this fingerprint liveness detection application in fingerprint recognition systems, significant security vulnerabilities can be protected against, allowing the technology to be used more broadly with greater confidence.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

At least the following is claimed:

1. A method for determining fingerprint liveness, comprising:

identifying a plurality of ridge center pixels defining a centerline of a ridge segment in a gray scale fingerprint image;

evaluating, for each of the plurality of ridge center pixels, gray scale values of pixels in the gray scale fingerprint image that are proximate to and located within a defined distance of that ridge center pixel to determine a center location of one or more local maxima in the gray scale fingerprint image, where the gray scale values are non-binary;

evaluating the gray scale values of pixels of the gray scale fingerprint image located about the center location of at least one local maximum of the one or more local maxima to classify the at least one local maximum as a pore;

determining features of each pore based upon an evaluation of the gray scale values of pixels of the gray scale fingerprint image that are located at a predefined radius around the center location of that pore; and determining liveness of the gray scale fingerprint image based at least in part upon distributions of the determined features.

2. The method of claim 1, wherein the centerline of the ridge segment is based upon a binary mask generated from the gray scale fingerprint image.

3. The method of claim 2, further comprising classifying pixels of the gray scale fingerprint image as ridge pixels or non-ridge pixels to generate the binary mask.

4. The method of claim 3, further comprising thinning the binary mask to identify the centerline of the ridge segment.

5. The method of claim 1, wherein classification of the one or more local maxima is based upon evaluation of only pixels of the gray scale fingerprint image encircling the one or more local maxima at the predefined radius using a circular derivative operator.

6. The method of claim 5, wherein the circular derivative operator is evaluated along a circular path at the predefined radius about the one or more local maxima.

7. The method of claim 1, wherein the one or more local maxima is classified as a pore in response to a comparison of a predefined threshold to a result that is determined using a circular derivative operator that evaluates the pixels located around the one or more local maxima at the predefined radius.

8. The method of claim 1, wherein determining features of the pore comprises determining a gray level mean ($m_g$), a standard deviation ($\sigma_g$), a variance ($\sigma_g^2$), or a maximum gray level difference ($D_g$) for all pixels located along a circular path having the predefined radius around the center location of the pore.

9. The method of claim 1, wherein the distributions of the determined features comprise one or more histograms of the determined features.

10. The method of claim 1, wherein determining liveness of the gray scale fingerprint image comprises classification based upon vector representations of the distributions of the determined features.

11. A system, comprising:

a processor circuit having a processor and a memory; and a detection system comprising instructions stored in the memory that, when executed by the processor, cause the processor circuit to:

evaluate gray scale values of pixels in a gray scale fingerprint image that are proximate to and located within a defined distance about each of a plurality of ridge center pixels on a centerline of a ridge segment in the gray scale fingerprint image to determine a center location of one or more local maxima in the gray scale fingerprint image, where the gray scale values are non-binary;

evaluate the gray scale values of pixels of the gray scale fingerprint image located about the center location of at least one local maximum of the one or more local maxima to classify the at least one local maximum as a pore;

determine features of each pore based upon an evaluation of the gray scale values of pixels of the gray scale fingerprint image surrounding that pore at a predefined radius around the center location of that pore; and determine liveness of the gray scale fingerprint image based at least in part upon distributions of the determined features.

12. The system of claim 11, wherein pixels of the gray scale fingerprint image are classified as ridge pixels or non-ridge pixels to generate a binary mask.

13. The system of claim 12, wherein the binary mask is thinned to identifying the plurality of ridge center pixels of the centerline of the ridge segment.

14. The system of claim 11, wherein the one or more local maxima is classified as a pore in response to a comparison of a predefined threshold to a result that is determined using a circular derivative operator that evaluates the pixels located around the one or more local maxima at the predefined radius.

15. The system of claim 11, wherein determining features of the pore comprises determining a gray level mean ($m_g$), a standard deviation ($\sigma_g$), a variance ($\sigma_g^2$), or a maximum gray level difference ($D_g$) for all pixels located along a circular path having the predefined radius around the center location of the pore.

16. The system of claim 11, wherein the processor circuit receives a series of gray scale fingerprint images that includes the gray scale fingerprint image.

17. The system of claim 16, wherein features of at least one pore are determined for each of the series of gray scale fingerprint images, where the features correspond to the at least one pore in each of the series of gray scale fingerprint images, and where the liveness of the gray scale fingerprint image is determined based at least in part upon comparison of the features corresponding to two or more consecutive images of the series of gray scale fingerprint images.

18. A non-transitory computer readable medium comprising instructions stored thereon, that when executed by a processor system, causes the processor system to:

evaluate, for each of a plurality of ridge center pixels on a centerline of a ridge segment in a gray scale fingerprint image, gray scale values of pixels in the gray scale fingerprint image that are proximate to and located within a defined distance about that ridge center pixel to determine a center location of one or more local maxima in the gray scale fingerprint image, where the gray scale values are non-binary;

evaluate the gray scale values of pixels of the gray scale fingerprint image located about the center location of at least one local maximum of the one or more local maxima to classify the at least one local maximum as a pore;

determine features of each pore based upon an evaluation of the gray scale values of pixels of the gray scale fingerprint image surrounding the pore at a predefined radius around the center location of that pore; and determine liveness of the gray scale fingerprint image based at least in part upon distributions of the determined features.

19. The non-transitory computer readable medium of claim 18, wherein classification of the one or more local maxima is based upon evaluation of only pixels of the gray scale fingerprint image encircling the one or more local maxima at the predefined radius using a circular derivative operator.

20. The method of claim 1, wherein the features of each pore comprises: number of pores identified in an image, pore-to-pore spacing along ridge segments, identification of open and closed pores, and perspiration diffusion out of the pore.

* * * * *